No. 646,185. Patented Mar. 27, 1900.
H. L. & C. MARLETT.
SELF HEATING DINNER PAIL.
(Application filed July 13, 1899.)
(No Model.) 2 Sheets—Sheet 1.

Witnesses.
Harry Kilgore
F. D. Merchant

Inventors
Harvey L. Marlett
Charles Marlett
By their Attorney,
Jas. F. Williamson No. 646,185. Patented Mar. 27, 1900.
H. L. & C. MARLETT.
SELF HEATING DINNER PAIL.
(Application filed July 13, 1899.)
(No Model.) 2 Sheets—Sheet 2.
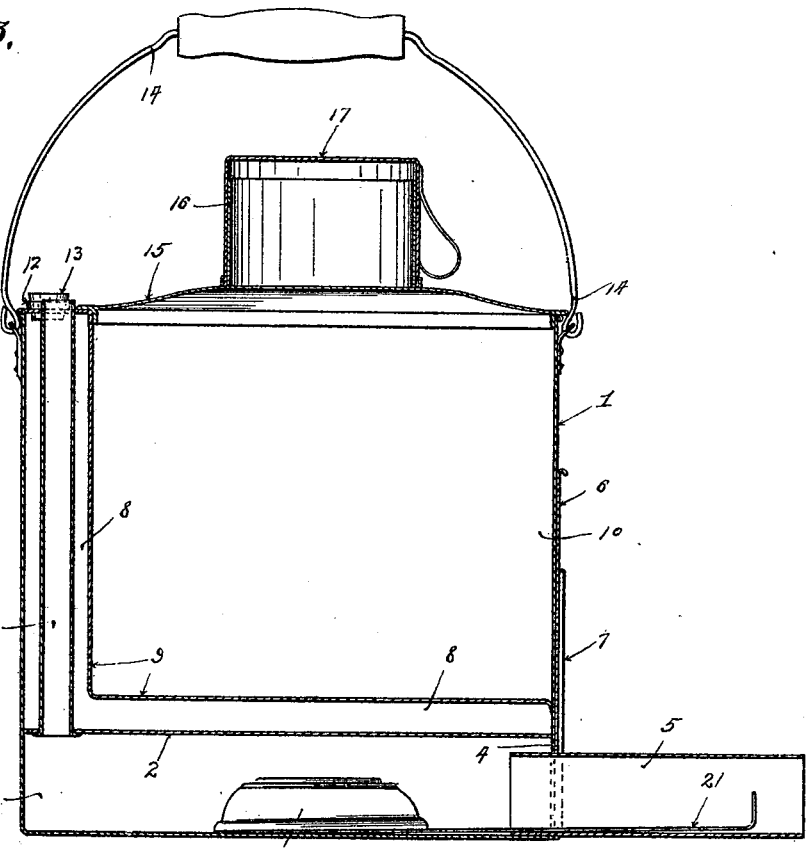
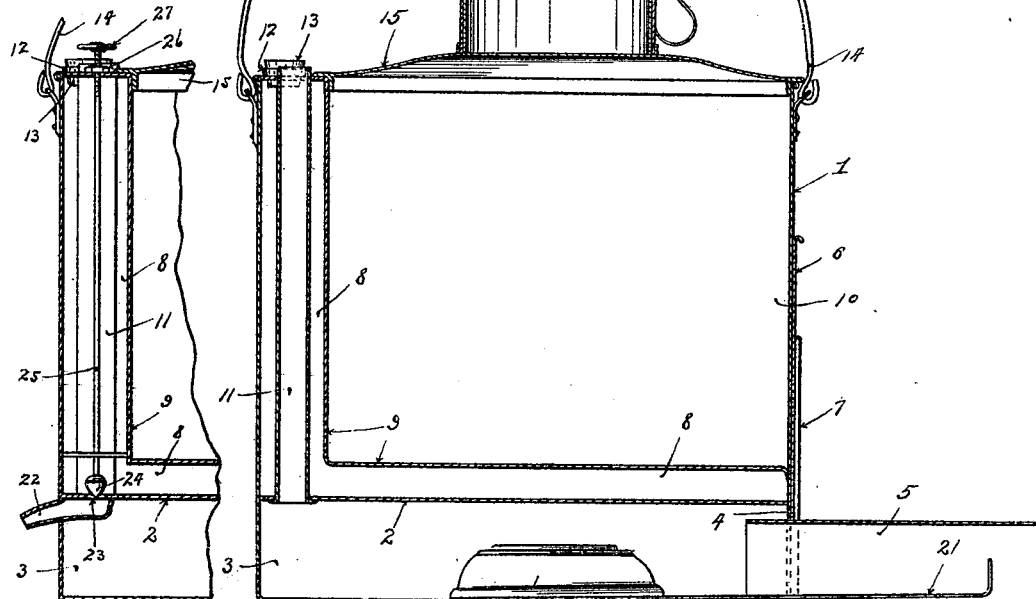
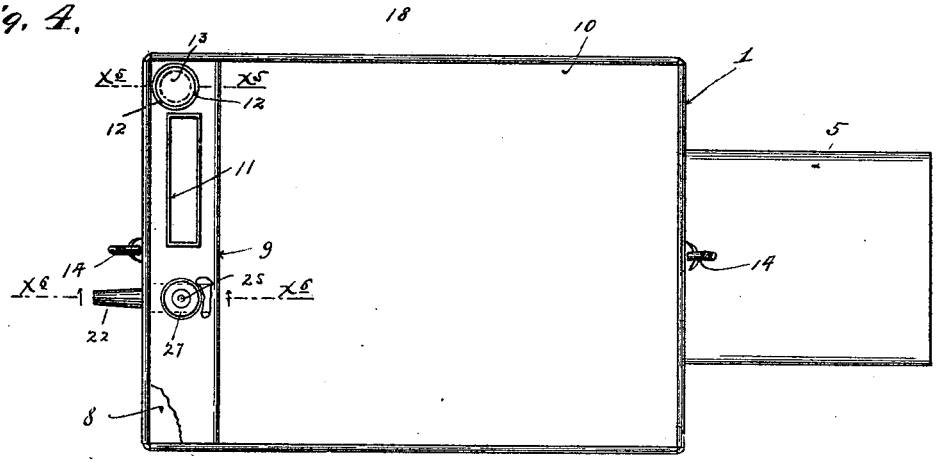
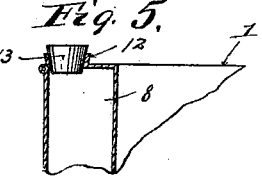
Witnesses.
Harry Kilgore
F. D. Merchant
Inventors
Harvey L. Marlett,
Charles Marlett,
By their Attorney,
Jas. F. Williams

UNITED STATES PATENT OFFICE.

HARVEY L. MARLETT, OF WARNER, SOUTH DAKOTA, AND CHARLES MARLETT, OF FARGO, NORTH DAKOTA.

SELF-HEATING DINNER-PAIL.

SPECIFICATION forming part of Letters Patent No. 646,185, dated March 27, 1900.

Application filed July 13, 1899. Serial No. 723,662. (No model.)

*To all whom it may concern:*

Be it known that we, HARVEY L. MARLETT, residing at Warner, Brown county, South Dakota, and CHARLES MARLETT, residing at Fargo, Cass county, North Dakota, citizens of the United States, have invented certain new and useful Improvements in Self-Heating Dinner-Pails; and we do hereby declare the following to be a full, clear, and exact description of the invention, such as will enable others skilled in the art to which it appertains to make and use the same.

Our invention has for its object to provide a self-heating dinner-pail or dinner-pail with heating attachment of simplified and improved construction, which will be of small cost in its first construction, durable and efficient in its action, and which may be run for the purpose of heating the contents of the pail at a very small cost.

To these ends our invention consists of the novel devices and combinations of devices hereinafter described, and defined in the claims.

The invention in its preferred form is illustrated in the accompanying drawings, wherein, like characters indicating like parts throughout the several views—

Figure 1:
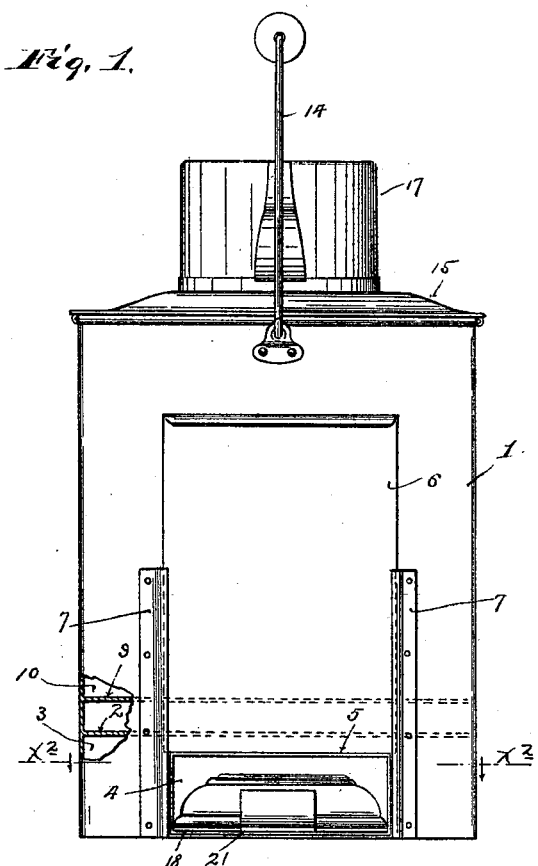
Figure 2:
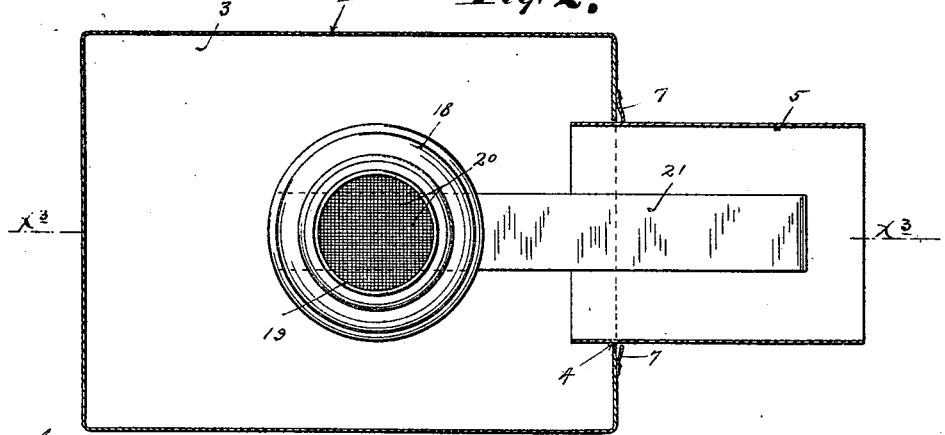

Figure 1 is a view in side elevation, showing a dinner-pail constructed and equipped in accordance with our invention, some parts of the same being broken away. Fig. 2 is a horizontal section taken on the line $x^2 x^2$ of Fig. 1. Fig. 3 is a vertical section taken through the pail on the line $x^3 x^3$ of Fig. 2, some parts being shown in full. Fig. 4 is a plan view of the pail, with the cover thereof removed. Fig. 5 is a detail in vertical section, taken on the line $x^5 x^5$ of Fig. 4, and Fig. 6 is a transverse section of a portion of the pail, taken on the line $x^6 x^6$ of Fig. 4.

In the preferred construction the body of the pail is in the form of a rectangular shell or box 1, provided with a false bottom 2, between the lower surface of which and the bottom of the pail a combustion-chamber 3 is formed. The combustion-chamber 3 is provided at one side of the pail with a rectangular opening 4, and closely fitting this opening 4 and working adjustably therein is a rectangular draft spout or box 5, the inner and outer ends of which are open. This draft spout or box 5 is of such length that it may be moved entirely within the combustion-chamber 3, and when this is done the opening 4 may be closed by a sliding gate or door 6, which works vertically in guides 7, secured to the side of the pail.

Extending over the entire upper surface of the false bottom 2 and then vertically upward at one side of the pail is a coffee tank or receptacle 8, which is formed between the said false bottom 2, the sides of the pail, and a rectangular partition-plate 9, which extends transversely completely across the pail and limits the holding capacity of the pail or the main compartment to the space indicated at 10.

A draft-flue or chimney 11, which is preferably rectangular in cross-section and is elongated lengthwise of the vertical section of the coffee-compartment 8, is extended vertically upward from one end of the combustion-chamber 3 to a point above the top of the pail. Opening through the top of the vertical portion of the coffee-compartment 8, close to one corner of the same, is a perforation or neck 12, through which the coffee or liquid may be poured into the coffee-compartment 8 and from which it may be poured out. For a reason which will hereinafter appear it should be noted and remembered that not only is this perforation or neck 12 located close to one corner of the vertical section of the coffee can or compartment, but also that one corner or edge of the draft-flue 11 opens very close to the said perforation 12. Normally the said perforation 12 may be closed by a cork or stopper 13 or other suitable device.

The pail is preferably provided with an ordinary bail 14 in the cover 15, the latter of which has the ordinary cup-ring 16 and cooperating cup 17.

The burner preferably employed is in the form of a flat or shallow cup 18, provided at its upper surface with a large central perforation or opening 19, which is covered by a thin wire-woven screen 20. The cup 18 will be filled with asbestos wool or other suitable fibrous or absorbent material. From the bottom of the cup 18 a long handle or strip 21 is projected, so that the lamp may be properly located within the combustion-chamber 3. The cup 18 is of such diameter that it may be readily passed through the draft spout or box 5.

In order that the coffee may be drawn out of the coffee-tank without tipping the pail upside down, a discharge-nozzle 22 is projected through one side of the pail, and an opening 23 in the bottom 2 of said pail delivers the coffee to the said nozzle. Normally the opening 23 is closed by a valve 24, the stem 25 of which works upward through the top of the coffee-compartment and has screw-threaded engagement at its upper end for coöperation with a nut 26 or other screw-threaded part on the top of the said coffee-compartment. Preferably the valve-stem 25 is provided at its upper and outer end with a handpiece 27, by means of which it may be turned. By turning the valve 24 and its stem 25 the said valve may be forced tightly into engagement with the walls of the perforation 23, or, by a reverse movement, may be raised clear of the same, so as to permit the escape of the coffee through the discharge nozzle or spout 22.

The liquid fuel is poured onto the absorbent material within the cup 18, and to heat the contents of the coffee-compartment 8 the lamp is lighted and placed within the combustion-chamber, substantially as shown in the drawings. By experiment I have found that gasolene will give a much greater heat in the same length of time than alcohol or any other combustible liquid with which I have experimented. I have also found that the gasolene will produce a great deal of smoke and requires a good supply of oxygen. In fact, I have found that without the so-called "draft spout or box" 5 the smoke will often be discharged from the entrance-passage 4 and will smoke up the side of the pail to a very objectionable extent. However, with the draft spout or box 5 or similar device, which when the device is in operation is pulled out more or less, usually about as shown in the drawings, the amount of smoke discharged through this opening is greatly reduced and usually entirely prevented, while in case the smoke does back up and flow outward through the smoke-box it will be discharged clear of the side of the pail, so that the pail will not be smoked.

As the coffee-compartment is extended entirely across the bottom of the pail, a great amount of heating-surface is exposed to the flame, and an additional amount of heating-surface is rendered effective on the coffee or other liquid contained in the compartment 8 in view of the fact that the exhaust-flue 11 is extended through the vertical portion of the said compartment.

As the opening 12 is located at one corner of the vertically-extended portion of the coffee-compartment 8, the entire contents of the same may be easily poured out.

This pail has been designed especially to meet the requirements of a pail to be used by laboring men and outdoor workmen. In the winter-time it is very common for workmen to have their dinners frozen solid. With the heating device above described if the coffee be frozen it will be first melted close to the bottom 2 and around the exhaust-flue 11, and as the exhaust-flue 11 is located close to the outlet-perforation 12 it will very soon thaw an opening through to this outlet. Hence any pressure which might otherwise be produced is permitted to escape, and danger of blowing up the pail is thus averted.

It will of course be understood that our invention above described is capable of modification as to its details of construction.

What we claim, and desire to secure by Letters Patent of the United States, is as follows:

1. A dinner-pail or similar device provided with a combustion-chamber and an exhaust-flue opening therefrom, and a draft spout or box open at both ends and mounted for adjustment into and from said combustion-chamber through one wall thereof, substantially as described.

2. A dinner-pail provided with a combustion-chamber having an outlet passage or flue and the inlet-opening 4, and the draft spout or box 5, open at both ends and mounted for longitudinal adjustments through said inlet 4, to project the outer end thereof more or less from the side of the pail, substantially as described.

3. In a dinner-pail, the combination with the main compartment 10 and the combustion-chamber 3, of the coffee-compartment 8 extending under the entire bottom of said compartment 10 and up one side thereof, an inlet-opening to said chamber 3 and an outlet-flue 11 extended upward from said chamber 3 through the vertical portion of said compartment 8, substantially as described.

4. In a self-heating dinner-pail, the combination with a combustion-chamber and a coffee-compartment, of an outlet-flue opening through said coffee-compartment and a perforation or opening in the said coffee-compartment immediately adjacent to the said outlet-flue, whereby in melting the frozen liquid within the coffee-compartment, a vent is afforded, substantially as described.

5. In a dinner-pail, the combination with the body-section 1, having the combustion-chamber 3 with the inlet 4 and suitable outlet, of the draft spout or box 5 fitting said opening 4 and movable into said combustion-chamber, and the sliding door or gate for closing said opening 4, substantially as and for the purposes set forth.

In testimony whereof we affix our signatures in presence of two witnesses.

HARVEY L. MARLETT.
CHARLES MARLETT.

Witnesses as to Harvey L. Marlett:
  C. L. BECKER,
  R. E. CALKIN.
Witnesses as to Charles Marlett:
  C. E. MANNING,
  F. O. SCHLIPF.